No. 754,638. PATENTED MAR. 15, 1904.
P. H. BRENNAN.
TRANSMISSION GEAR.
APPLICATION FILED DEC. 21, 1903.
NO MODEL. 3 SHEETS—SHEET 3.
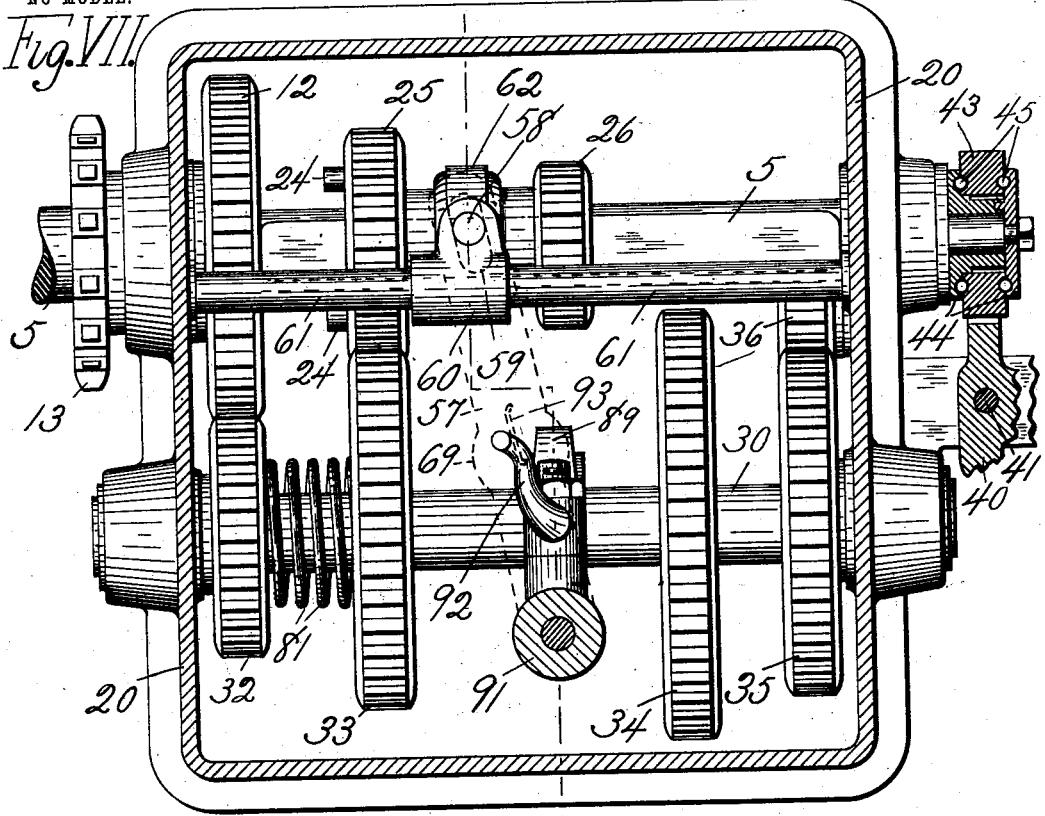
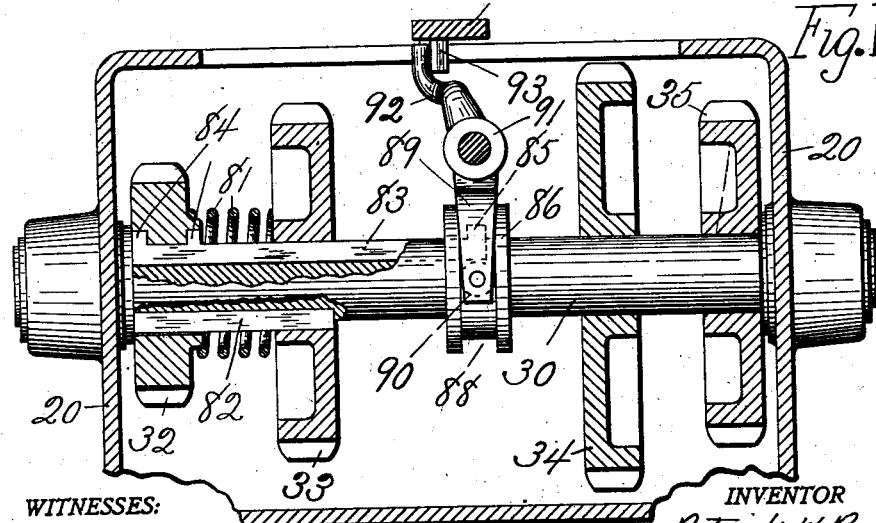
WITNESSES:
INVENTOR
Patrick H. Brennan
BY
Alfred Wilkinson
ATTORNEY.

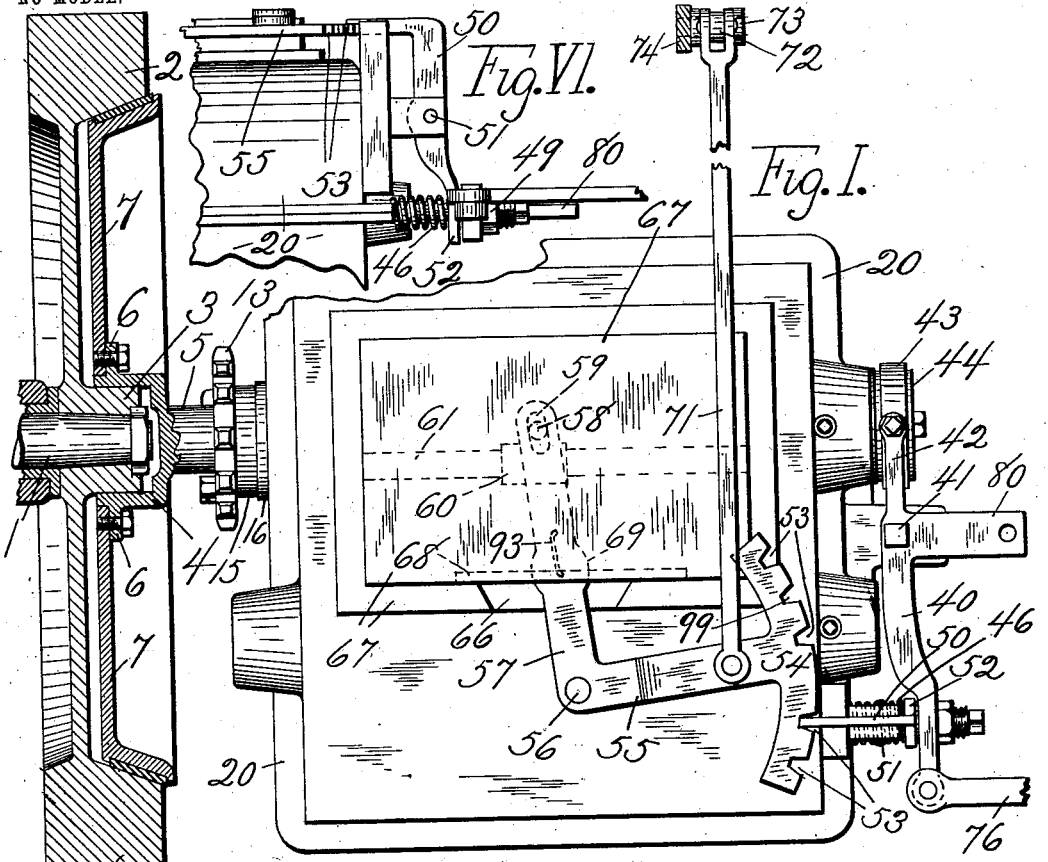

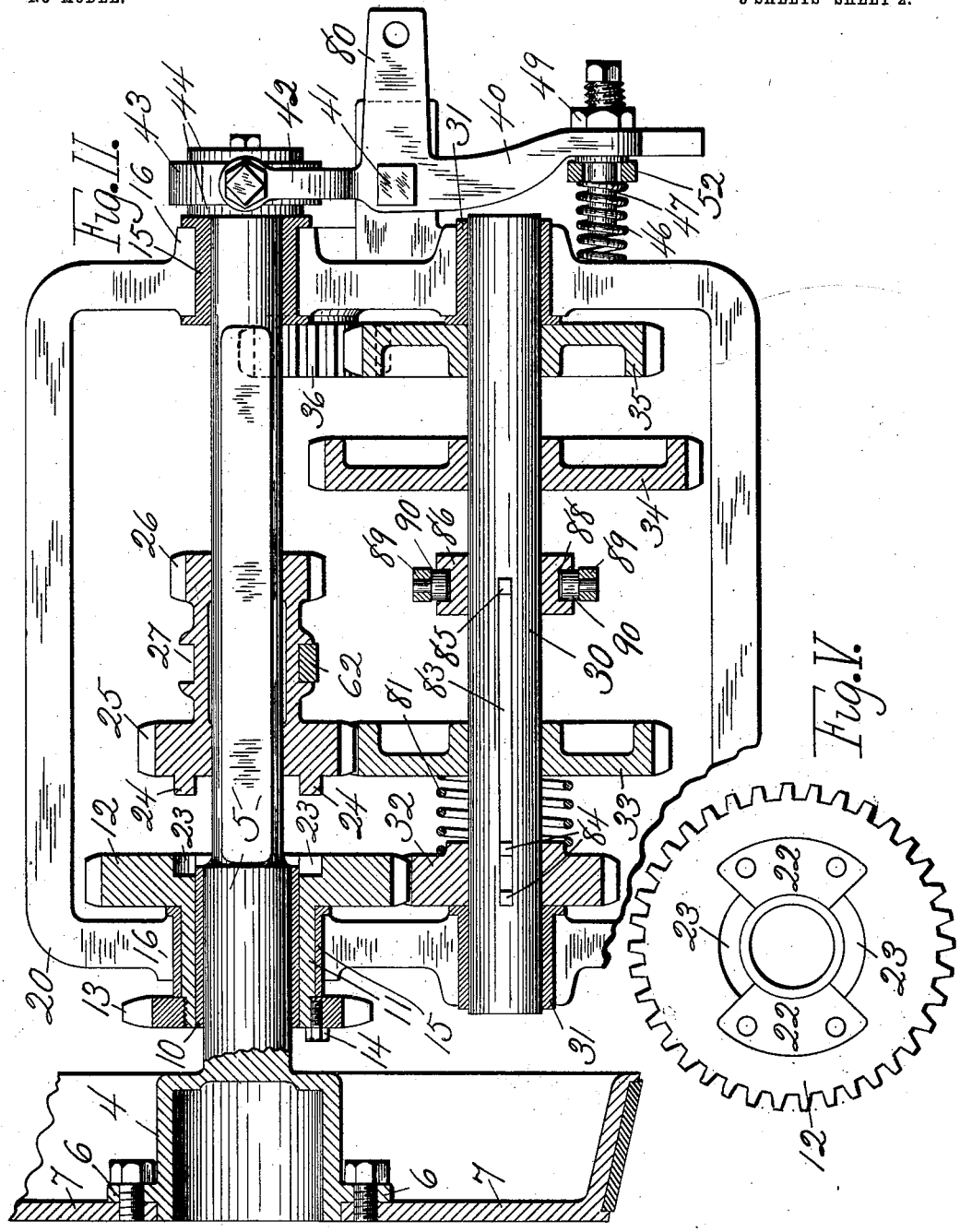

No. 754,638. Patented March 15, 1904.

UNITED STATES PATENT OFFICE.

PATRICK H. BRENNAN, OF SYRACUSE, NEW YORK.

TRANSMISSION-GEAR.

SPECIFICATION forming part of Letters Patent No. 754,638, dated March 15, 1904.

Application filed December 21, 1903. Serial No. 185,912. (No model.)

*To all whom it may concern:*

Be it known that I, PATRICK H. BRENNAN, a citizen of the United States, residing at Syracuse, in the county of Onondaga and State of New York, have invented certain new and useful Improvements in Transmission-Gear; and I do hereby declare the following to be a full, clear, and exact description of the invention, such as will enable others skilled in the art to which it appertains to make and use the same.

My invention relates to a variable transmission-gear for automobiles and similar purposes; and it consists in an arrangement of parts by which great compactness is obtained, so that the gear may be set close to the engine to make direct connection therewith and may be arranged laterally across the frame or in any convenient position on the vehicle.

My invention also lies in the various details of construction and arrangement of parts, one of the more important features being the construction which permits the arrangement of the combined shaft and locking mechanism at the opposite end of the gear-case from the engine.

The important elements are the main shaft, a clutch thereon to connect the shaft to the engine, a counter-shaft, gears thereon for forward driving at three speeds, and a single gear for backward driving, a sliding gear on the main shaft, means normally to lock the sliding gear, so that it cannot be changed in position while the power is on, and a lever and other parts and connections situated at the opposite end of the mechanism from the clutch and engine to release the clutch and simultaneously to unlock the sliding gear, so that it may be moved by a suitable lever and connections from engagement with one gear to another.

My invention will be understood by reference to the drawings herewith, in which the reference-numerals of the specification are used to indicate the corresponding parts in all the figures.

Figure I is a top plan of my invention with the clutch in section. Fig. II is an enlarged horizontal section through the shafts parallel to Fig. I. Fig. III is an end elevation of Fig. I. Fig. IV is a cross-section parallel to Fig. III through the inner arm of the bell-crank. Fig. V is an inner elevation of the main gear. Fig. VI is a side elevation of a portion of the gear-case, showing the locking mechanism. Fig. VII is a top plan of the gears and shafts with the gear-case in section. Fig. VIII is a vertical section of the preceding through the counter-shaft.

In the figures, 1 indicates the shaft of an explosive or other suitable engine carrying the female element 2 of the friction-clutch, provided with the hub 3, fitting within the hollow hub 4 of main shaft 5, so as to center the transmission-gear and maintain in alinement with the motor. To flange 6 of hub 4 is securely bolted the male member 7 of the clutch.

10 is an inner bronze bearing for the main shaft, fitting snugly within the tubular shank 11 of the main gear 12, threaded on its outer end to receive the sprocket 13, retained in position by the set-screws 14.

15 is the outer bronze bearing for main gear, fitted to bearing 16 between the two halves of the gear-case 20, which is made in any suitable form, and preferably of two corresponding halves flanged and bolted to fit, and provided with legs 19 or other suitable means for supporting and attaching to the vehicle-frame. Preferably the bearings for all the shafts are formed half in each half of the gear-case, so that the shafts easily may be removed when the upper half of the gear-case is unbolted.

As shown in Fig. V, to suitable counterbores on the inner face of the main gear are fitted and secured, as by screws, the two corresponding segmental hardened-steel plates 22, easily renewable when worn without renewing the entire main gear and having formed between them the interlocking spaces 23, with which engage the lugs 24 on the outer face of the sliding gear 25, provided at its opposite end with the integral small gear 26 and at any suitable point between the two gears with the groove 27 for the sliding lever 28. This sliding gear is fitted to slide on the main shaft and turn therewith by means of suitable feather and spline or by making the main shaft square, as here shown.

30 is the counter-shaft arranged parallel to the main shaft, also in bronze bearings 31, arranged between the halves of the gear-case and carrying the driving-pinion 32, intermediate pinion 33, low-speed pinion 34, and reversing-pinion 36, meshing with the connecting transmitting-pinion 36.

The main shaft is moved longitudinally in the gear-case to throw the clutch member into or out of engagement by means of lever 40, pivotally supported at 41 and having forked end 42, connected to ring 43, fitted between collars 44, secured on the outer end of main shaft. 45 represents ball-bearings arranged between the ring and the collars. At its opposite end spiral spring 46, fitted to guide 47, threaded at its outer end and provided with securing-nut 49, exerts constant pressure outwardly on end of lever 40 to maintain the clutch elements in engagement. Latch 50, pivotally supported at 51 and having an arm 52, arranged between said spring and a shoulder on the guide, normally engages with one of the notches 53 in quadrant 54 on the outer arm 55 of the bell-crank lever, journaled at 56 and having an inner arm 57, inwardly extending and connected by pin 58 and slot 59 with collar 60, fitted to slide on guide-rod 61, secured in the case and carrying sliding lever 28, having a forked end 62, fitted to groove 27 of the sliding gear, whereby the sliding gear is normally locked in each operative position, but unlocked and shifted, as hereinafter described. This inner arm 57 extends inwardly through groove 66 in flange-cover 67, bolted in position on the gear-case, and carries a shutter 68, adapted to close the groove, preventing the splashing out of the oil. Where this inner arm passes through the slot in the shutter, it is cut in the two arcs 69, adapting itself to the shutter as the arm swings. This bell-crank lever and the sliding gear are operated by connection 71, crank 72 on sleeve 73, and the lever 74, also on said sleeve and arranged conveniently to the hand of the operator.

By means of connecting-rod 76, connected to the end of lever 40, as shown in Fig. 1, or if more convenient to the side arm 80 on said lever made for this purpose, and by pedal-crank 77, fulcrumed at 78 and connected at its lower end to said connecting-rod 76, the main shaft is moved or shifted outwardly, releasing the friction-clutch, and at the same time and by the same means the latch 50 is rocked out of engagement with the quadrant-notch, unlocking it and permitting the sliding gear to be moved from one position to the other, so that by this arrangement the power must first be thrown off before the sliding gear can be shifted; but at the same time while the sliding gear is moving from one position to the next through a neutral position by means of its own momentum the main shaft continues to rotate, which is necessary to permit either the large or the small gear on the sliding gear to enter into engagement with the teeth of either of the pinions. If both shafts were stationary, this would be difficult, if not impossible.

I have also provided means (best shown in Figs. IV, VII, and VIII) for disengaging the driving-pinion from the main gear when running at high speed to save power and wear on the parts. This driving-pinion 32 may be fixed on the counter-shaft; but in my preferred construction it is held normally in position by spring 81 engaging with intermediate pinion 33, but is arranged to slide or be moved inwardly against the spring on its retaining-key 82 and counter-shaft by means of connecting-feather 83, connected to pinion 32 by shoulders 84 and by shoulder 85 on its inner end to sliding collar 86, with whose circumferential groove 88 engages forked inner lever 89, provided with antifriction-rollers 90. This forked inner lever is pivotally fulcrumed on bearing 91, secured to or made integral with top wall of gear-case and is operated when the sliding gear is moved into engagement with the main gear by engagement of its upper curved arm 92 with elongated lug 93 or other suitable projection on inner arm 57 of bell-crank lever.

The construction and arrangement of parts may be varied without departing from the spirit of my invention.

Heretofore the three-speed variable transmission-gears have not been made compact, but often were from twenty-five to thirty inches long, necessitating the longitudinal arrangement of the mechanism on the vehicle with inconvenient connections—such as bevel-gears, cranks, &c.—and preventing the arrangement of the transmission-gear in alinement with the engine and direct connection from the rear axle to the main shaft. The arrangement of the shaft-shifting mechanism has been inconvenient, and the shift-rod and lever often took up such a space equal to that of the sliding gear itself. By my invention I have made great gains in weight, simplicity, amount of repairs, and compactness. The means for shifting the main shaft is compactly arranged at the end of the gear-case opposite to the engine. No extra length is required for the means for shifting sliding gear and only a space of fourteen to sixteen inches for the gear-case, so that it can be arranged in any suitable position on the frame in front or at the rear, but commonly laterally, so as to be directly connected to engine without complicated connections, insuring transmission and permitting the use of a direct drive-chain.

My automatic lock is an important feature of my invention, and it will be noticed that I provide the quadrant with a fifth notch 99, corresponding to and with which the latch engages when the small gear is in the dead position, what I call the "neutral" position, between the reversing-pinion and the low-speed pinion. This permits the clutches to be engaged and the power to be applied before the small gear is moved from position of reverse operation into engagement with low-speed gear. If the sliding gear could be moved from reverse or stop immediately to intermediate or high speed, the change would be too sudden, imposing a strain on the mechanism.

Having thus described my invention, what I claim as new, and desire to secure by Letters Patent, is—

1. In a transmission-gear mechanism, the combination with a suitable gear-case, of a main shaft journaled and moving longitudinally therein, means at one end of the shaft to make connection with the engine-shaft, a lever connected to the other end to move the main shaft into or out of said connection, a main gear fitted on the main shaft and having depressions therein, means connected to the main gear to communicate the power, a sliding gear provided at one end with a small gear and fitted on the main shaft to turn therewith, a lever and connections to slide the sliding gear on the main shaft, projections on the sliding gear to engage with the depressions on the main gear, a counter-shaft journaled in the case parallel with the main shaft, a driving-shaft, a driving-pinion on the counter-shaft to engage with the main gear, an intermediate pinion on the counter-shaft to engage with the sliding gear, a low-speed pinion on the counter-shaft to engage with the small gear, a transmitting-pinion suitably journaled to engage with the small gear and a reversing-pinion on the counter-shaft to engage with the transmitting-pinion.

2. In a transmission-gear mechanism, the combination with a suitable gear-case, of a main shaft journaled and moving longitudinally therein, means at the outer end of the shaft to make connection with the engine-shaft, a lever connected to the other end to move the main shaft into and out of said connection, a main gear fitted on the main shaft and having depressions therein, means connected to the main gear to communicate the power, a sliding gear provided at one end with a small gear and fitted on the main shaft to turn therewith, projections on the sliding gear to engage with the depressions on the main gear, a counter-shaft journaled in the case parallel with the main shaft, a driving-pinion on the counter-shaft to engage with the main gear, an intermediate pinion on the counter-shaft to engage with the sliding gear, a low-speed pinion on the counter-shaft to engage with the small gear, a transmitting-pinion suitably journaled to engage with the small gear and a reversing-pinion on the counter-shaft to engage with the transmitting-pinion, a bell-crank lever journaled on top of the case having an inner arm extending into the case, a guide-rod in the case parallel to the shafts, a sliding collar connected to the inner arm of the lever, a sliding lever on the collar engaging with the sliding gear and operative connections to the bell-crank lever.

3. In a transmission-gear mechanism, the combination with a suitable gear-case, of a main shaft journaled and moving longitudinally therein, means at the outer end of the shaft to make connection with the engine-shaft, a main gear fitted on the main shaft and having depressions therein, means connected to the main gear to communicate the power, a sliding gear provided at one end with a small gear and fitted on the main shaft to turn therewith, a bell-crank lever having a notched quadrant and connections to slide the sliding gear on the main shaft, projections on the sliding gear to engage with the depressions on the main gear, a counter-shaft journaled in the case parallel with the main shaft, a driving-pinion on the counter-shaft to engage with the main gear, an intermediate pinion on the counter-shaft to engage with the sliding gear, a low-speed pinion on the counter-shaft to engage with the small gear, a transmitting-pinion suitably journaled to engage with the small gear and a reversing-pinion on the counter-shaft to engage with the transmitting-pinion, a latch pivotally supported and adapted to engage with the quadrant on the bell-crank lever to lock the sliding gear in each of its operative positions, and a shaft-lever pivotally supported on the outside of the inner end of the case, to engage with the main shaft to move it longitudinally and to engage with the latch and withdraw it from engagement with the quadrant.

4. In a transmission-gear mechanism, the combination with a suitable gear-case, of a main shaft journaled and moving longitudinally therein, means at the outer end of the shaft to make connection with the engine-shaft; a main gear fitted on the main shaft and having depressions therein, means connected to the main gear to communicate the power, a sliding gear provided at one end with a small gear and fitted on the main shaft to turn therewith, projections on the sliding gear to engage with the depressions on the main gear; a counter-shaft journaled in the case parallel with the main shaft, a driving-pinion on the counter-shaft to engage with the main gear, an intermediate pinion on the counter-shaft to engage with the sliding gear, a low-speed pinion on the counter-shaft to engage with the small gear, a transmitting-pinion suitably journaled to engage with the small gear and a reversing-pinion on the counter-shaft to engage with the connecting-pinion; a bell-crank lever pivotally supported on the case, having an inner arm extending into the case and a notched quadrant on its outer arm, a guide-rod in the case parallel to the shafts, a sliding collar having a pin engaging with the inner arm of the lever, a sliding lever on the collar engaging with the sliding gear; a latch pivotally supported on the case and adapted to engage with the quadrant; a shaft-lever pivotally supported on the case and connected to the main shaft to move it longitudinally and adapted to engage with the latch and withdraw it from engagement with the quadrant, and operative connections respectively to the bell-crank lever and to the shaft-lever.

5. In a transmission-gear mechanism for motor-cars, a suitable case, a main shaft journaled in the case, a main gear fitted to the outer end of the shaft, within the case and having interlocking spaces therein and an outwardly-extending shank, a sprocket on the outer end of the shank, a hollow hub and clutch member on the outer end of the shaft adapted to engage with corresponding parts connected to the engine-shaft, a shaft-lever pivotally supported on the outside of the inner end of the case and having one end engaging with the inner end of the shaft and an outwardly-extending free arm; a sliding gear fitted to be moved longitudinally on the main shaft to turn therewith, and provided with a circumferential groove, said sliding gear having lugs on its outer end to engage with the interlocking spaces on the main gear and having a small gear on its inner end, a transmitting-pinion suitably journaled within the case at its inner end to engage with the small gear, intermediate, low-speed and reversing pinions on the counter-shaft to engage respectively with the main, sliding, small and transmitting gears; a bell-crank lever journaled on the case having an outer arm provided with a notched quadrant and an inner arm extending into the case through a slot, a guide-rod arranged within the case parallel to the shafts, a sliding collar on the guide-rod connected to the inner arm of the bell-crank lever, a sliding lever on the collar engaging with the circumferential groove in the sliding gear; a spring arranged to engage with, and force out the free arm, to maintain the clutch members in engagement, a latch pivotally supported on the exterior of the case having an arm arranged to be engaged by said free arm, a bent end to engage with the quadrant, and suitable operative connections respectively to the bell-crank lever and to the shaft-lever.

6. In a transmission-gear mechanism for motor-cars, a suitable case, a main shaft journaled in the case, a main gear fitted to the outer end of the shaft within the case and having interlocking spaces therein and an outwardly-extending shank, a sprocket on the shank, a hollow hub and clutch member on the outer end of the shaft adapted to engage with corresponding parts connected to the engine-shaft, a shaft-lever pivotally supported on the outside of the inner end of the case and having one end engaging with the inner end of the shaft and an outwardly-extending free arm; a sliding gear fitted to be moved longitudinally on the main shaft but to turn therewith, and provided with a circumferential groove, said sliding gear having lugs on its outer end to engage with the interlocking spaces on the main gear and having a small gear on its inner end, a transmitting-pinion suitably journaled within the case at its inner end to engage with the small gear, driving, intermediate, low-speed and reversing pinions on the counter-shaft to engage respectively with the main, sliding, small and transmitting gears; a bell-crank lever journaled on top of the case having an outer arm provided with a notched quadrant and an inner arm extending into the upper portion of the case through a slot, a shutter fitted to said inner arm to close the slot in the cover; a guide-rod arranged within the case parallel to the shafts, a sliding collar on the guide-rod connected to the inner arm of the bell-crank lever, a sliding lever on the collar engaging with the circumferential groove in the sliding gear; a spring arranged to engage with, and force out the free arm, to maintain the clutch elements in engagement, and a latch pivotally supported on the exterior of the case having an arm arranged to be engaged by said free arm and a bent end to engage with the quadrant, said quadrant being provided with notches for the latch corresponding to the reverse, low-speed, intermediate and high-speed positions and with a notch corresponding to the neutral position.

7. In a transmission-gear mechanism for motor-cars, a suitable case, a cover to close the top opening in the case, a main gear having a tubular shank journaled at the outer end of the case, a sprocket on the shaft, a main gear journaled in the shaft and in the inner end of the case, a clutch member on the outer end of the shaft adapted to engage with a corresponding part connected to the engine-shaft, collars on the inner end of the shaft outside of the case, a ring fitted to the end of the shaft between the collars, ball-bearings between the ring and the collars, a shaft-lever pivotally supported outside the case on its inner end, having a forked end engaging with said ring and an outwardly-extending free arm; hardened-steel plates fitted to counterbores on the inner face of the main gear, forming interlocking spaces between them; a sliding gear fitted to be moved longitudinally on the main shaft but to turn therewith, and provided with a circumferential groove, said sliding gear having lugs on its outer end to engage with the interlocking spaces on the main gear and a small gear on its inner end, a transmitting-pinion suitably journaled within the case at its inner end to engage with the small gear, driving, intermediate, low-speed and reversing pinions on the counter-shaft to engage respectively with the main, sliding, small and transmitting gears; a bell-crank lever journaled on top of the case having an outer arm provided with a notched quadrant and an inner arm extending into the upper portion of the case through a slot in the cover, said inner arm being provided with a slotted inner end and with opposite arcs where it extends through the cover, a shutter fitted to said arcs and adapted to close the slot in the cover; a guide-rod arranged within the case above the shafts and parallel thereto, a sliding collar on the guide-rod having a pin engaging with the slot in the inner arm of the bell-crank lever, a sliding gear on the collar having a forked end engaging with the circumferential groove in the sliding gear; a collared guide on the free arm of the shaft-lever, a spiral spring fitted to said guide and engaging with the case to force out the free arm and to maintain the clutch members in engagement, a latch pivotally supported on the exterior of the case adjacent to said free arm, having an arm arranged between the said collar and spring on the guide and having a bent end to engage with the quadrant, said quadrant being provided with notches for the latch corresponding to the reverse, low-speed, intermediate and high-speed positions and with a notch corresponding to the neutral positions, and suitable operative connections respectively to the bell-crank lever and to the shaft-lever.

8. In a transmission-gear mechanism for motor-cars, a suitable case, a main shaft journaled in the case, a main gear fitted to the outer end of the shaft within the case and having interlocking spaces therein and an outwardly-extending shank, a chain-sprocket on the shank, a clutch member on the outer end of the shaft adapted to engage with the corresponding parts connected to the engine-shaft, a shaft-lever pivotally supported on the inner end of the case and having one end engaging with the inner end of the shaft and having an outwardly-extending free arm; a sliding gear fitted to be moved longitudinally on the main shaft but to turn therewith, and provided with a circumferential groove, said sliding gear having lugs on its outer end to engage with the interlocking spaces on the main gear and having a small gear on its inner end, a transmitting-pinion suitably journaled within the case at its inner end to engage with the small gear, driving, intermediate, low-speed, and reversing pinions on the counter-shaft to engage respectively with the main, sliding, small and transmitting gears; a bell-crank lever journaled on top of the case having an outer arm provided with a notched quadrant and an inner arm extending into the upper portion of the case through a slot, a guide-rod arranged within the case above the shafts and parallel thereto, a sliding collar on the guide-rod connected to the inner arm of the bell-crank lever, a sliding lever on the collar engaging with the circumferential groove in the sliding gear, a spring arranged to engage with, and to force out the free arm, to maintain the clutch elements in engagement, a latch pivotally supported on the exterior of the case, having an arm arranged to be engaged by the free arm and having a bent end to engage with the quadrant; a sliding collar fitted to move freely on the counter-shaft and having a circumferential groove, a forked lever engaging with the groove on said sliding collar, said forked inner lever being pivotally supported on a bearing within the case and having an upper arm engaging with the inner arm of the bell-crank lever, a connecting-feather, connecting the driving-pinion to the sliding collar, and a spring arranged between the driving-pinion and the intermediate pinion, tending to maintain the former in engagement with the main gear, said driving-pinion being connected to the counter-shaft to turn therewith but free to move longitudinally thereon.

9. In a transmission-gear mechanism for motor-cars, a suitable case, a main shaft journaled in the case, a main gear fitted to the outer end of the shaft within the case and having interlocking spaces therein and an outwardly-extending shank, a sprocket on the shank, a clutch member on the outer end of the shaft adapted to engage with a corresponding part connected to the engine-shaft, a shaft-lever pivotally supported outside the case on its inner end and having one end engaging with the inner end of the shaft and an outwardly-extending free arm; a sliding gear fitted to be moved longitudinally on the main shaft but to turn therewith, and provided with a circumferential groove, said sliding gear having lugs on its outer end to engage with the interlocking spaces on the main gear and a small gear on its inner end, a transmitting-pinion suitably journaled within the case at its inner end to engage with the small gear, driving, intermediate, low-speed and reversing pinions on the counter-shaft to engage respectively with the main, sliding, small and transmitting gears; a bell-crank lever journaled on top of the case having an outer arm provided with a notched quadrant and an inner arm having a slotted end, extending into the upper portion of the case through a slot, a shutter fitted to said inner arm and adapted to close the slot in the cover; an elongated lug on the under side of the inner arm within the case, a guide-rod arranged within the case above the shafts and parallel thereto, a sliding collar on the guide-rod having a pin engaging with the slot in the inner arm of the bell-crank lever, a sliding lever on the collar having a forked end engaging with the circumferential groove in the sliding gear, a spring arranged to engage with, and force out the free arm, to maintain the clutch elements in engagement, a latch pivotally supported on the exterior of the case adjacent to said free arm, having an arm arranged between the said collar and spring on the guide and having a bent end to engage with the quadrant, said quadrant being provided with notches for the latch corresponding to the reverse, low-speed, intermediate and high-speed positions and with a notch corresponding to the neutral position, a sliding collar fitted to move freely on the counter-shaft and having a circumferential groove, a forked lever having antifriction-rollers engaging with the groove on said sliding collar, said forked inner lever being pivotally supported on a bearing within the case and having an integral, curved upper arm engaging with said elongated lug on the inner arm of the bell-crank lever, and a connecting-feather having shoulders at each end connecting the driving-pinion to the sliding collar, a spiral spring arranged between the driving-pinion and the intermediate pinion, tending to maintain the former in engagement with the main gear, and a feather to connect the sliding pinion to turn with the counter-shaft.

10. In a transmission-gear mechanism for motor-cars, a suitable case composed of two corresponding halves, a flanged cover fitted to close a top opening in the case, a main gear having a tubular shank journaled at the outer end between the two halves of the case, a sprocket on the shaft, a main shaft journaled in the shank at the outer end and between the two halves of the case at the inner end, a hollow hub and clutch member on the outer end of the shaft adapted to engage with corresponding parts connected to the engine-shaft, collars on the inner end of the shaft, a ring fitted to the end of the shaft between the collars, ball-bearings between the ring and the collars, a shaft-lever pivotally supported on the outside of the inner end of the case and having a forked end engaging with said ring and an outwardly-extending free arm; hardened-steel plates fitted to counterbores on the inner end of the main gear, forming interlocking spaces between them; a sliding gear fitted to be moved longitudinally on the main shaft but to turn therewith, and provided midway of its length with a circumferential groove, said sliding gear having lugs on its outer end to engage with the interlocking spaces on the main gear, a small gear on the inner end of the sliding gear; a transmitting-pinion suitably journaled within the case at its inner end to engage with the small gear; driving, intermediate, low-speed and reversing pinions on the counter-shaft to engage respectively with the main, sliding, small and transmitting gears; a bell-crank lever journaled on top of the case having an outer arm provided with a notched quadrant and an inner arm extending into the upper portion of the case through a slot in the cover, said inner arm being provided with a slotted inner end, and with opposite arcs where it extends through the cover, a shutter fitted to said arcs and adapted to close the slot in the cover; an elongated lug on the under side of the inner arm within the case; a guide-rod arranged within the case above the shafts and parallel thereto, a sliding collar on the guide-rod having a pin engaging with the slot in the inner arm of the bell-crank lever, a sliding lever on the collar having a forked end engaging with the circumferential groove in the sliding gear; a collared guide on the free arm of the shaft-lever, a spiral spring fitted to said guide and engaging with the case to force out the free arm and to maintain the clutch members in engagement, a latch pivotally supported on the exterior of the case adjacent to said free arm, having an arm arranged between the said collar and spring on the guide and having a bent end to engage with the quadrant, said quadrant being provided with notches for the latch corresponding to the reverse, low-speed, intermediate and high-speed positions and with a notch corresponding to the neutral position; a sliding collar fitted to move freely on the counter-shaft and having a circumferential groove, a forked lever having antifriction-rollers engaging with the groove on said sliding collar, said forked inner lever being pivotally supported on a bearing within the case and having an integral, curved, upper arm engaging with said elongated lug on the inner arm of the bell-crank lever, and a connecting-feather having shoulders at each end connecting the driving-pinion to the sliding collar, a spiral spring arranged between the driving-pinion and the intermediate pinion, tending to maintain the former in engagement with the main gear, a suitable feather to connect the sliding pinion to turn with the counter-shaft, and suitable operative connections respectively to the bell-crank lever and to the shaft-lever.

In testimony whereof I affix my signature in presence of two witnesses.

PATRICK H. BRENNAN.

Witnesses:
C. C. SCHOENECK,
M. E. GAGON.